(12) United States Patent
Buchegger

(10) Patent No.: US 7,735,193 B2
(45) Date of Patent: Jun. 15, 2010

(54) SPRING HINGE FOR SPECTACLES

(75) Inventor: Harald Buchegger, St. Konrad (AT)

(73) Assignee: Redtenbacher Prazisionsteile Ges.m.b.H., Scharnstein (AT)

( * ) Notice: Subject to any disclaimer, the term of this patent is extended or adjusted under 35 U.S.C. 154(b) by 668 days.

(21) Appl. No.: 11/705,733

(22) Filed: Feb. 13, 2007

(65) Prior Publication Data

US 2007/0192991 A1    Aug. 23, 2007

(30) Foreign Application Priority Data

Feb. 17, 2006    (AT)    ................................ A 258/2006

(51) Int. Cl.
*G02C 5/22*    (2006.01)
(52) U.S. Cl. ........................................ 16/228; 351/113
(58) Field of Classification Search .................... 16/228; 351/113, 114, 111, 140, 153, 158, 119, 41
See application file for complete search history.

(56) References Cited

U.S. PATENT DOCUMENTS

| | | | | |
|---|---|---|---|---|
| 3,567,315 A | * | 3/1971 | Speer | 351/113 |
| 4,005,930 A | * | 2/1977 | Guenin | 351/113 |
| 4,494,834 A | * | 1/1985 | Tabacchi | 351/153 |
| 4,689,851 A | * | 9/1987 | Beyer | 16/228 |
| 4,747,183 A | * | 5/1988 | Drlik | 16/228 |
| 4,991,258 A | * | 2/1991 | Drlik | 16/228 |
| 5,406,339 A | * | 4/1995 | Chen | 351/153 |
| 5,473,395 A | * | 12/1995 | Huang | 351/113 |
| 6,505,933 B2 | * | 1/2003 | Schuchard et al. | 351/113 |
| 6,585,371 B1 | * | 7/2003 | Lin | 351/113 |
| 6,814,438 B2 | | 11/2004 | Desbiez-Piat | |
| 7,350,271 B2 | * | 4/2008 | Genelot | 16/228 |

FOREIGN PATENT DOCUMENTS

| | | |
|---|---|---|
| EP | 0 632 306 A1 | 1/1995 |
| EP | 1 335 236 A1 | 8/2003 |
| FR | 2 275 791 | 1/1976 |
| GB | 2 266 783 | 11/1993 |
| WO | WO 00/63739 A1 | 10/2000 |
| WO | WO 01/31386 | 5/2001 |
| WO | WO 2005/111699 A1 | 11/2005 |

\* cited by examiner

*Primary Examiner*—Chuck Y. Mah
(74) *Attorney, Agent, or Firm*—Collard & Roe, P.C.

(57) ABSTRACT

A spring hinge for spectacles is described having a hinge part (1) guided displaceably in a bow-side housing (2) in the bow longitudinal direction and having a U-shaped sliding part (4), which projects from the hinge part (1) in the displacement direction and engages in a housing recess (3), and which receives a coiled spring (14) between its two legs (6), whose hinge-side end is supported on a buttress (13) belonging to the housing (2) and whose diametrically opposite end is supported on the web (5) connecting the two legs (6) of the U-shaped sliding part (4), the hinge part (1) having the sliding part (4) comprising a passage opening (16) running in the longitudinal direction of the coiled spring (14). In order to achieve advantageous construction conditions, it is suggested that the buttress (13) be screwed through the passage opening (16) of the hinge part (1) running coaxially to the coiled spring (14) into a female thread (11) of the housing (2) which is coaxial to the coiled spring (14).

2 Claims, 3 Drawing Sheets

SPRING HINGE FOR SPECTACLES

FIELD OF THE INVENTION

The present invention relates to a spring hinge for spectacles having a hinge part guided displaceably in a bow-side housing in the bow longitudinal direction and having a U-shaped sliding part, which projects from the hinge part in the displacement direction and engages in the housing recess, and which receives a coiled spring between its two legs, whose hinge-side end is supported on a buttress belonging to the housing and whose diametrically opposite end is supported on the web connecting the two legs of the U-shaped sliding part, the hinge part having the sliding part comprising a passage opening running in the longitudinal direction of the coiled spring.

DESCRIPTION OF THE PRIOR ART

In spring hinges of this type, implementing the hinge part comprising two hinge tabs having the sliding part as a U-shaped bow, which is guided displaceably in a housing recess in longitudinal direction, is known (EP 1 335 236 A1). This U-shaped bow, which carries the two hinge tabs on its free leg ends, receives a coiled spring between its legs which is supported on one side on the web of the bow connecting the two legs to one another and on the other side on a buttress, which projects from a housing floor and extends between which the bow legs, so that the bow, which is held in the recess delimited by a stop, may only be displaced from the stop position against the restoring force of the coiled spring. The sliding part of the hinge part, which is formed by two parallel legs, represents an advantageous requirement for a tight and non-twisting displacement guide, but with the disadvantage that the spring hinge may not be mounted in the displacement direction of the hinge part, but rather transversely thereto, because the web of the U-shaped bow must enclose the buttress projecting from the housing floor. For this reason, the housing is implemented as open in the area diametrically opposite the housing floor, in order to be able to insert the U-shaped bow through this housing opening perpendicularly to the bow plane into the housing recess. The housing opening required for mounting the spring hinge is to be closed using a housing cover, which not only increases the construction outlay, but rather also must assume guiding tasks for the U-shaped bow, so that the guide conditions are a function of the particular fastening conditions of the cover.

Extending the legs of the U-shaped sliding part to the hinge tabs in order to be able to insert the buttress in the longitudinal direction of the coiled spring into the housing between these hinge tabs is additionally known, so that the buttress for the coiled spring does not have to be inserted transversely to the longitudinal direction of the coiled spring into the housing (EP 0 632 306 A1). To engage the buttress with the housing, however, a transverse displacement of the buttress is again necessary, which makes the construction complex, particularly because the buttress must be secured by a transverse web between the legs of the sliding part after its transverse displacement. Providing a spring in a housing forming the bearing for the spectacle bow, which impinges the front face of the bow via a pressure plunger, which is held so it is axially displaceable in a limited way in the housing, is additionally known for the elastic engagement of a spectacle bow in its usage position (WO 00/63739 A1). The pressure plunger is prevented from being ejected from the housing by the coiled spring by an expanding sleeve, which may be radially expanded with the aid of the pressure plunger and engages behind an undercut of the housing using an annular shoulder.

Finally, using a T-shaped sliding part for a spring hinge, a coiled spring being provided on each side of the sliding part, which is supported on the transverse web of the sliding part, is known (WO 2005/111699 A1). The spring support in relation to the housing receiving the sliding part is provided via buttresses, which are inserted in female threads of the housing running coaxially to the coiled spring. This is possible because the buttresses are accessible laterally from the hinge joint.

SUMMARY OF THE INVENTION

The present invention is thus based on the object of improving a spring hinge for spectacles of the type described at the beginning in such a way that not only simple mounting conditions, but rather also a smaller constructive outlay may be ensured, without having to dispense with good guiding of the hinge part.

The present invention achieves the stated object in that the buttress is screwed through the passage opening of the hinge part running coaxially to the coiled spring into a female thread of the housing coaxial to the coiled spring.

Because, as a result of these measures, the buttress for the hinge-side support of the coiled spring may be screwed from the hinge side, coaxially to the coiled spring, into the housing, after the hinge part has been inserted in the axial direction into the housing recess, a housing which is closed around the circumference may advantageously be used. It must only be ensured that the web connecting the two legs of the U-shaped sliding part, which runs transversely to the axis of the female thread, may penetrate the threaded hole for the female thread. The threaded hole of the female thread must thus be implemented as open toward the legs of the sliding part and may only have threaded segments between the guide sections of the housing recess for the legs. In order that the hinge-side buttress for the coiled spring may be screwed from the hinge side through the hinge part displaceably guided in the housing into the female thread accessible from the front face of the housing and the screwed-in buttress does not obstruct the displacement of the sliding part against the restoring force of the coiled spring, the hinge part and its sliding part are to be provided with a passage opening coaxial to the coiled spring, which receives the buttress with play, so that the buttress may be screwed into the female thread through this passage opening and/or may be axially displaced in relation to the sliding part in this passage opening.

In order to additionally be able to guide the coiled spring between the two legs of the sliding part, the housing-side buttress for the coiled spring may comprise a threaded head engaging in the female thread of the housing and a guide pin for receiving the coiled spring, projecting from the threaded head. The guide pin additionally results in a mounting aid, because the coiled spring pushed onto the guide pin is inserted with the buttress through the passage opening between the legs of the hinge part inserted in the housing recess and may be fixed by screwing the threaded head of the buttress into the female thread of the housing.

BRIEF DESCRIPTION OF THE DRAWING

The subject matter of the present invention is illustrated for exemplary purposes in the drawing.

DESCRIPTION OF THE PREFERRED EMBODIMENT

Figure 1:
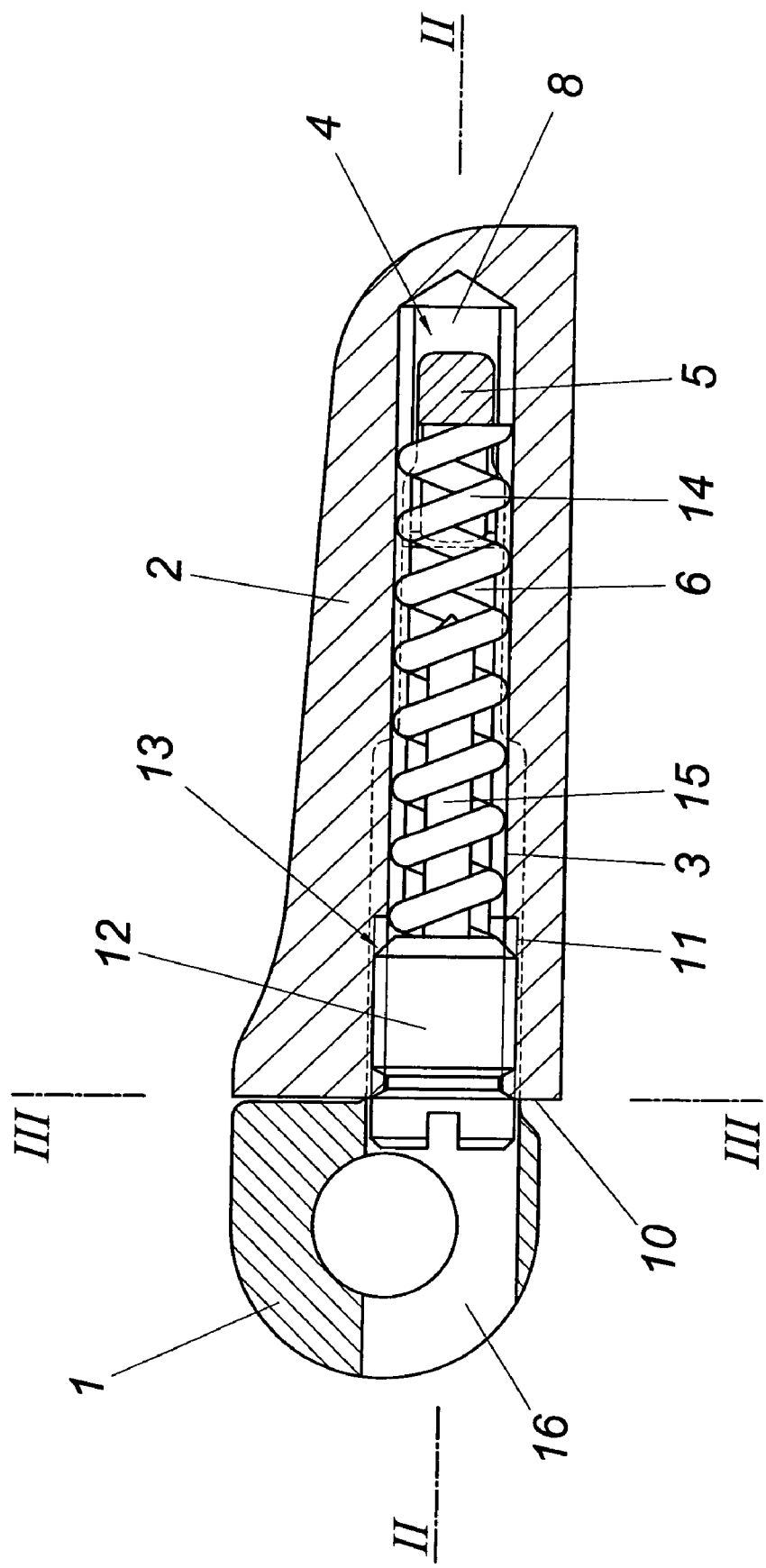
FIG. 1 shows a spring hinge for spectacles according to the present invention in a simplified longitudinal section perpendicular to the hinge axis.
Figure 2:
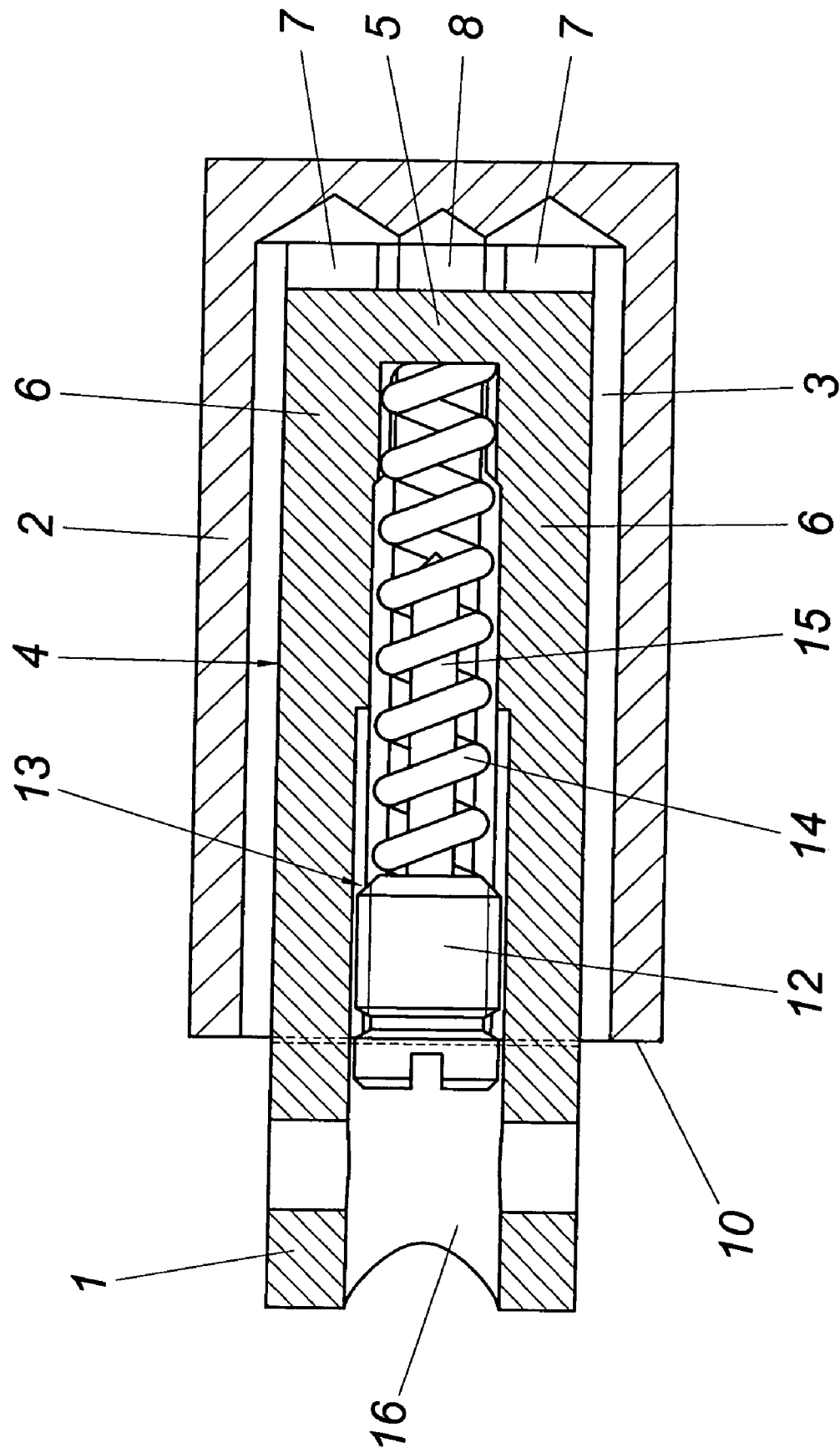
FIG. 2 shows this spring hinge in a section along lines II-II of FIG. 1.
Figure 3:
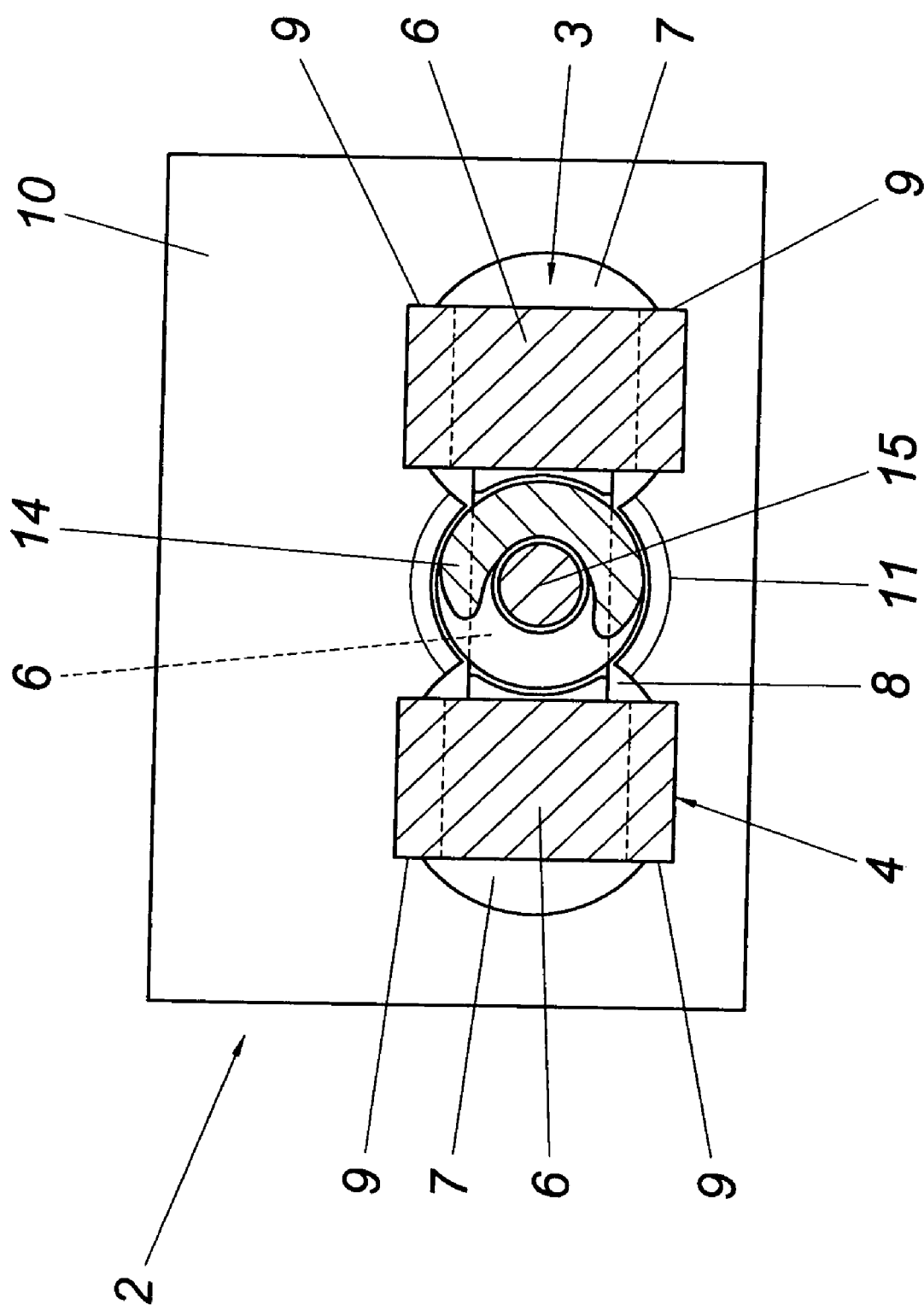
FIG. 3 shows a section along lines III-III of FIG. 1 in a larger scale.

A spring hinge for spectacles according to the present invention has, according to the exemplary embodiment shown, two hinge parts connected to one another by a hinge axis, of which one hinge part is attached to a bow cheek, while the other hinge part 1 is displaceably mounted in a housing 2 fastened to a spectacle bow. For this purpose, the hinge part 1, which forms a middle hinge tab having a bearing eye for the hinge axis, is provided with a sliding part 4 engaging in a housing recess 3, which is implemented as U-shaped and has two parallel legs 6 connected to one another by a web 5. The housing recess 3 for displaceably guiding the sliding part 4 is assembled from two lateral guide sections 7 for the two legs 6 and an opening 8 for the web 5, which connect the two guide sections 7. For reasons of simple production, both the guide sections 7 and also the connection opening 8 are formed by holes which overlap in cross-section, which have guide depressions 9 in the area of the guide sections 7 for receiving the leg 6, which is rectangular in cross-section, so it is rotationally locked, however.

The hole for the connection opening 8 is provided in the area of the housing front face 10 with a female thread 11, into which a threaded head 12 of a buttress 13 for a coiled spring 14 may be screwed, which comes to rest between the legs 6 of the sliding part 4 and whose end diametrically opposite the buttress 13 is supported on the web 5 of the sliding part 4. To guide this coiled spring 14, the threaded head 12 of the buttress 13 is provided with an axially projecting guide pin 15, which is enclosed by the coiled spring 14. So that the buttress 13 may be screwed in the axial direction through the hinge part 1 into the female thread 11, a passage opening 16 coaxial to the female thread 11 is provided in the hinge part, which extends into the axial area of the leg 6 of the sliding part 4 and has a larger internal diameter than the external diameter of the threaded head 12 of the buttress 13. Through this measure, it is possible to screw the buttress 13 through the passage opening 16 of the hinge part 1 into the female thread 11 of the housing 2. In addition, the screwed-in buttress 13 does not obstruct the displacement of the sliding part in the housing recess 3.

To mount the spring hinge, firstly the sliding part 4 of the hinge part 1 is inserted from the front face 10 of the housing 2 into the housing recess 3. The coiled spring 14 may then be pushed onto the guide pin 15 of the buttress 13 in order to screw the coiled spring 14 together with the buttress 13 through the passage opening 16 of the hinge part 1 into the female thread 11 of the housing 2. The mounting is terminated by screwing the threaded head 12 of the buttress 13 into the female thread 11. The coiled spring 14 clamped between the threaded head 12 of the buttress 13 and the web 5 of the sliding part 4 impinges the sliding part 4 to retract it into the housing recess 3, so that the hinge part 1 may only be displaced in the extension direction in relation to the housing 2 against the restoring force of the coiled spring 14.

The invention claimed is:

1. A spring hinge for spectacles comprising:
   (a) a housing having a longitudinal direction and a housing recess having a female thread;
   (b) a coiled spring coaxial to the female thread extending in the longitudinal direction;
   (c) a hinge part guided displaceably in the housing in the longitudinal direction, said hinge part comprising a passage opening extending in the longitudinal direction coaxially to the coiled spring and a U-shaped sliding part extending in a displacement direction of the hinge part, engaging in the housing recess, and comprising first and second legs and a web connecting said first and second webs; and
   (d) a buttress screwed through the passage opening into the female thread;
   wherein said coiled spring is received between said first and second legs and has a hinge-side end supported on the buttress and an opposite end supported on the web connecting the first and second legs of the U-shaped sliding part.

2. The spring hinge according to claim 1, wherein the buttress for the coiled spring comprises a threaded head engaging in the female thread of the housing and a guide pin projecting from the threaded head for receiving the coiled spring.

* * * * *